(12) United States Patent
Nakamura et al.

(10) Patent No.: US 6,311,123 B1
(45) Date of Patent: Oct. 30, 2001

(54) VEHICLE CONTROL METHOD AND VEHICLE WARNING METHOD

(75) Inventors: Mitsuru Nakamura; Jie Bai, both of Hitachinaka (JP)

(73) Assignees: Hitachi, Ltd., Tokyo; Hitachi Car Engineering Co., Ltd., Hitachinaka, both of (JP)

( * ) Notice: Subject to any disclaimer, the term of this patent is extended or adjusted under 35 U.S.C. 154(b) by 0 days.

(21) Appl. No.: 09/605,052

(22) Filed: Jun. 28, 2000

(30) Foreign Application Priority Data

Jun. 28, 1999 (JP) .................................................. 11-181070

(51) Int. Cl.[7] ..................................................... G01S 13/93
(52) U.S. Cl. .......................... 701/96; 701/300; 342/71; 342/454; 180/169; 340/435; 123/352
(58) Field of Search ........................... 701/96, 301, 223; 340/903; 342/70, 69

(56) References Cited

U.S. PATENT DOCUMENTS

| 5,166,681 | * | 11/1992 | Bottesch et al. ................ 340/933 |
| 5,420,792 | * | 5/1995 | Butsuen et al. ................... 701/102 |
| 5,467,283 | | 11/1995 | Butsuen et al. ................... 364/461 |
| 5,479,173 | | 12/1995 | Yoshioka et al. .................. 342/70 |
| 5,483,453 | | 1/1996 | Uemura et al. ............... 364/424.02 |
| 5,708,584 | * | 1/1998 | Doi et al. ........................ 701/102 |
| 5,745,870 | * | 4/1998 | Yamamoto et al. .............. 701/301 |
| 5,761,629 | * | 6/1998 | Gilling ............................... 701/96 |
| 5,806,019 | * | 9/1998 | Ishiyama .......................... 701/300 |
| 5,901,806 | * | 5/1999 | Takahashi ......................... 180/170 |
| 5,938,714 | * | 8/1999 | Satonaka .......................... 701/96 |
| 5,959,569 | * | 9/1999 | Khodabhai ......................... 342/70 |
| 5,964,822 | * | 10/1999 | Alland et al. ..................... 701/301 |

FOREIGN PATENT DOCUMENTS

| 0 605 104 | 7/1994 | (EP) . |
| 0 657 857 | 6/1995 | (EP) . |
| 0 899 148 | 3/1999 | (EP) . |
| 6-282798 | 10/1994 | (JP) . |
| 8-83400 | 3/1996 | (JP) . |

* cited by examiner

Primary Examiner—Tan Nguyen
Assistant Examiner—Tuan C To
(74) Attorney, Agent, or Firm—Crowell & Moring LLP

(57) ABSTRACT

In order to occur a collision warning to prevent the collision in accurate by detecting the preceding vehicle or target, a vehicle lane position estimation device comprising a means for measuring a distance between said host vehicle and said preceding vehicle or a oncoming vehicle, a direction angle from said host vehicle, an angular velocity and a velocity of said host vehicle, a means for calculating lateral and longitudinal distance between said host vehicle and said preceding vehicle or said oncoming vehicle, a means for capturing a front stationary object, a means for obtaining movement of the preceding vehicle or position of the oncoming vehicle, and a means to estimate a lane position of said front stationary object from a relationship of the stationary object being captured and the preceding vehicle being obtained and a positional relationship with the oncoming vehicle.

3 Claims, 17 Drawing Sheets

FIG. 10
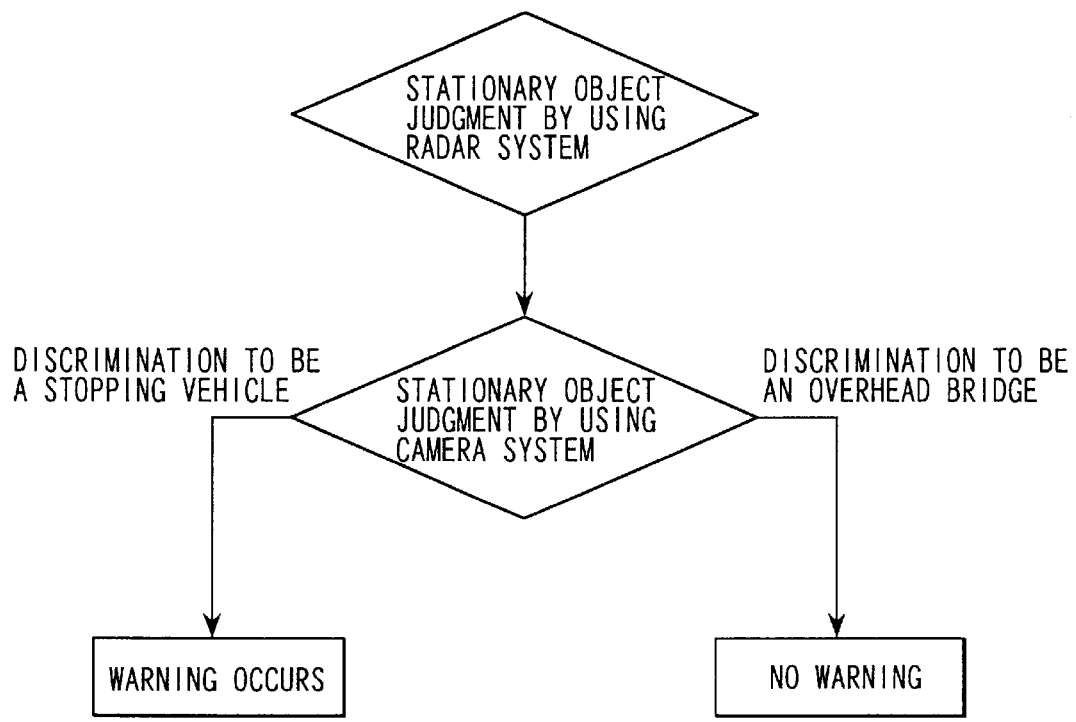
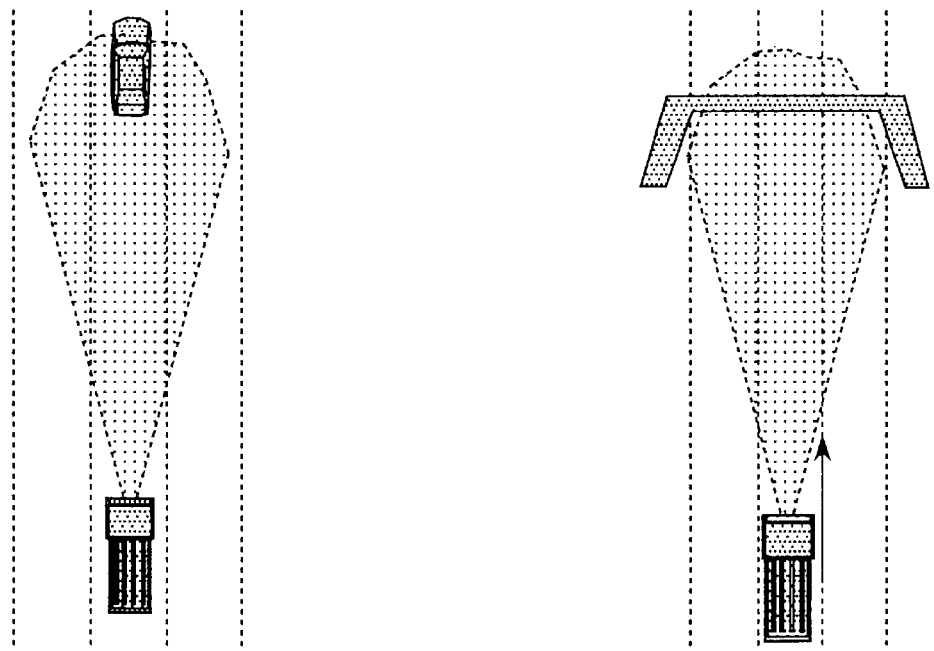

T1, T2, T3 : WARNING OCCURRENCE POINT
P : CHANGING POLE POINT

VEHICLE CONTROL METHOD AND VEHICLE WARNING METHOD

BACKGROUND OF THE INVENTION

1. The Technical Field that the Invention Belongs to

The present invention relates to an estimation device using a radar to detect dangerous objects for a vehicle.

Especially the present invention relates to the estimation device for distinguishing various kinds of non-dangerous objects which are generally met in typical vehicle driving environment and the dangerous objects which are authenticity.

2. Prior Art

A lot of trials to discriminate the dangerous objects that can be trusted, were performed in a field of a vehicle radar system to measure a distance to the dangerous objects and a relative velocity thereof.

In a Japanese Patent Laid-open No. 6-282798 bulletin, a target search device is mentioned, the target search device comprising a target capture means to capture the target by searching periphery of a service body and to get a relative position of the target to the service body, a circular orbit estimation means to estimate a circular orbit of the service body in a turning motion of the service body, based on the relative position of the target which the target capture means got and the circular orbit of the service body (4) which the circular orbit estimation means estimated, and a control means to judge whether the target is located in the circular orbit and to distinguish the target located on a course of the service body.

In a Japanese Patent Laid-open No. 8-83400 bulletin, a method to distinguish dangerous objects for the vehicle from the objects which is not the dangerous objects in the vehicle radar system which can detect at least one object on the road near the vehicle driving in the first vehicle lane is mentioned, said method comprising the steps of a step to generate a radar beam having enough beam width to irradiate the object in the first vehicle lane and a second vehicle lane which is next thereto, and at least a part of the radar beam generated along a first axis which is generated in a right angle substantially, a step to receive a message of a reflex signal from the object irradiated, a step to estimate a velocity of the object irradiated about a vehicle velocity in a direction of the second axis (x) which is substantially parallel to the service direction of the vehicle based on reflection signal, a step to measure the velocity of the vehicle using at least one velocity sensor, a step to judge the irradiated object to be dangerous when a sum of measured the vehicle velocity and estimated the velocity which is parallel to the object is bigger than a predetermined threshold, and a step to judge the irradiated object not to be dangerous when a sum of measured the vehicle velocity and estimated the velocity which is parallel to the object is smaller than the predetermined threshold.

SUMMARY OF THE INVENTION

3. The Subject that Invention is Going to Solve

A sensing requirement for a system should be thinking about as that a distance with a preceding vehicle(including stopping vehicle and an object, herein after called as a target) is controlled to be a desired value (ACC: Adaptive Cruise Control) by detecting the lead car in forward of host vehicle lane, or a collide warn is occurred when coming too much close to the preceding vehicle or the target.

For example, following three phases may be considered.

The first step: A detectivity ability, that is, may the forward target (the vehicles and road side object) be recognized?

i) A distance to the target (max especially), relative velocity and detectivity power of angle.

ii) An accuracy of the vehicle lane judgment of the host vehicle lane/others vehicle lane.

The second step: Discrimination ability, that is, may the forward target be recognized?

Especially, is the forward stationary object in forward of the host vehicle discriminated? (For example, the road side object such as a stationary vehicle, a corner pole and road signs, and an object on the road such as an overhead bridge can be distinguished?)

The third step: Intention decision, that is, which direction is the driver going to go to?

Is the forward obstacle included in a driving path in the future based on the driver intention? (there is no need to occur the warning when not included.)

Referring to the above, an object of the present invention is to provide a vehicle lane position estimation device of the preceding vehicle or the target by improving the vehicle lane decision accuracy of the host vehicle lane/others vehicle lane and by detecting the preceding vehicle in forward of the host vehicle lane or the target, so that the distance with the preceding vehicle is controlled to be a desired value or a collision warning to prevent the collision with the target is generated in accurate.

Further, another object of the present invention is to provide a vehicle lane position estimation device of the forward stationary object which may recognize in accurate whether the stationary object is a dangerous objects on the host vehicle lane or not or whether it is on the host vehicle lane or not.

Further, another object of the present invention is to distinguish the stopping preceding vehicle and the stationary object such as a road sign on the road side or an overhead bridge, and to warn or control (decelerate) the stopping vehicles which is in forward of the host vehicle.

A Means to Solve the Subject

According to the present invention, algorithm for estimating the host vehicle lane to be accurate in a curved road and for estimating an accurate correction when a position correction is necessary, is provided on the basis of a movement of the preceding vehicle which the radar caught and other sensor information, various data from the vehicles side are received, vehicle lane position estimation of the preceding vehicle is performed with a sensing information got by a millimeter wave radar, and a one body type millimeter wave radar system is built in a communications network function that can transmit an warning or a control command information to the vehicle side and decision/control function, is provided.

In such the vehicle lane position estimation device as above, the present invention further comprising a means for judging whether a curve of said road is a transition curve section where a curvature radius thereof changes every moment sometimes, or a maximum curve section where said curvature radius does not changes, and a means for correcting a curvature radius Rf of said host vehicle used for correcting said curvature radius Rf of said preceding vehicle to be smaller than a predetermined value when a transition curve is in an introduction part of the curve, and for correcting said curvature radius Rs to be larger than said predetermined value when said transition curve is in an rear part of the curve.

In such the vehicle lane position estimation device as above, a vehicle lane boundary position is obtained by estimating a vehicle lane position of plural preceding vehicle, the host vehicle is judged to be right or left of the vehicle lane boundary, and a vehicle lane judgment position of said host vehicle is offset towards right or left.

In such the vehicle lane position estimation device as above, the present invention further comprising a millimeter wave radar and a gyro sensor are used as said means for measuring.

In such the vehicle lane position estimation device as above, the present invention further comprising a means obtaining a distance of the vehicles from said preceding vehicle, and a means for warning when said distance becomes a predetermined distance.

The present invention relates to a vehicle lane position estimation device for estimating a position of a vehicle lane of a stationary object (a forward stationary object) to be located before an host vehicle, comprising a means for measuring a distance between said host vehicle and said preceding vehicle or an oncoming vehicle, a direction angle from said host vehicle, an angular velocity and a velocity of said host vehicle, a one vehicle lane sensing means for obtaining a vehicle lane of a road, a means for calculating a lateral displacement between said host vehicle and said preceding vehicle or said oncoming vehicle, a longitudinal displacement therebetween and a curvature radius of said host vehicle, a means for capturing a forward stationary object, a means for obtaining a movement of said preceding vehicle or a position of said oncoming vehicle, a means for estimating a vehicle lane position of said forward stationary object from a movement relationship of said preceding vehicle obtained and said forward stationary object captured or a position relationship with said oncoming vehicle, and a means for warning when said forward stationary object is in a vehicle lane of said host vehicle.

In such the vehicle lane position estimation device as above, the present invention further comprising a means for recognizing whether said forward stationary object is an object on the road such as an overhead bridge.

BRIEF DESCRIPTION OF THE DRAWINGS

FIG. 10 is illustration to discriminate an overhead bridge and a stopping vehicle.

DETAILED DESCRIPTION OF THE PREFERRED EMBODIMENT

An embodiment of the present invention will be explained based on a drawings.

Figure 1:
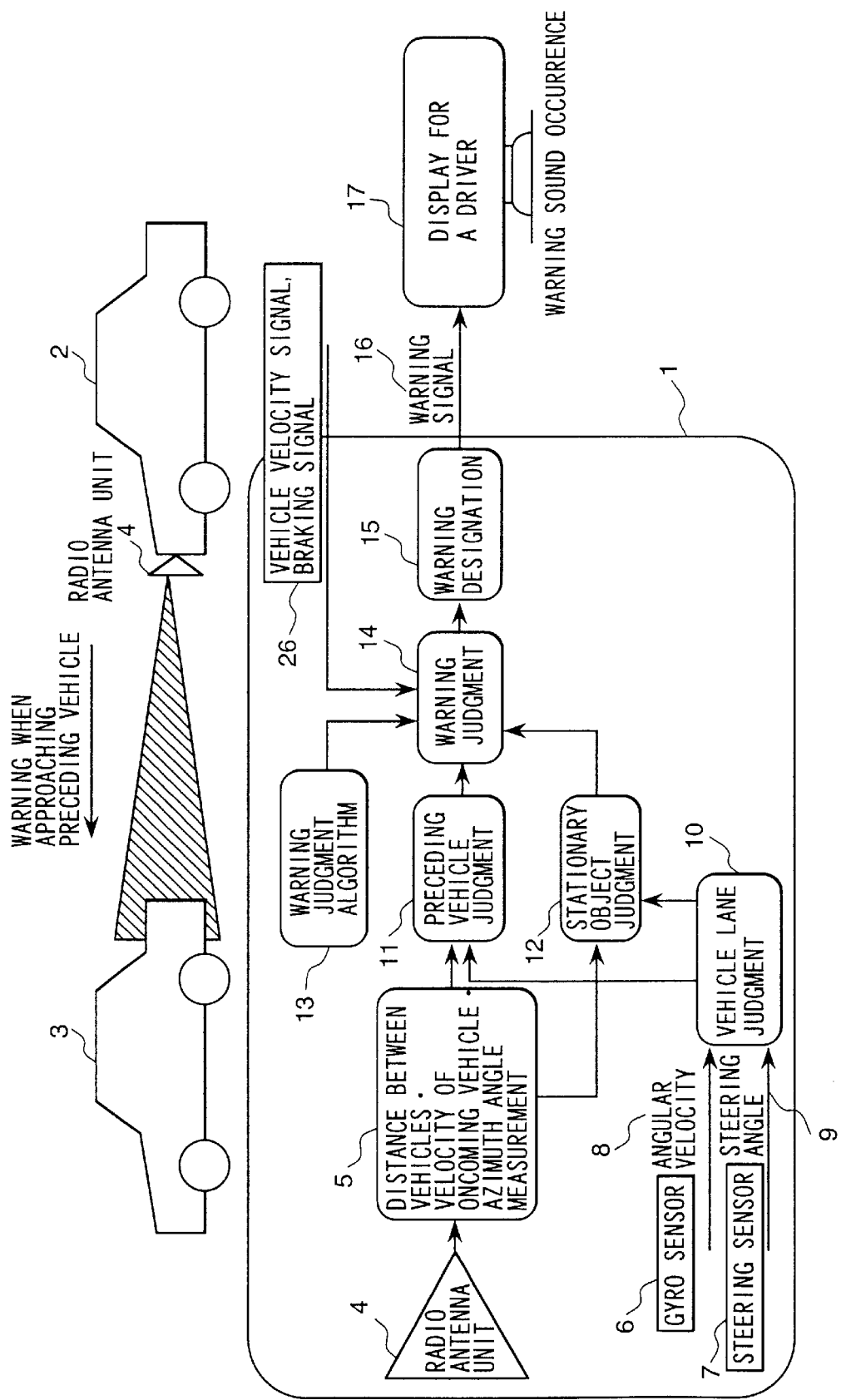
FIG. 1 is a contour block diagram of a distance between vehicles alarm system.

FIG. 1 shows a distance between the vehicles alarm system 1 using a millimeter wave radar, a gyro sensor, or a steering sensor.

The figure shows a system configuration in a case that millimeter wave radar signal is generated from a radio antenna unit 4 toward a vehicle 3 from a host vehicle 2, and warn when approaching.

The distance between the vehicles·the relative velocity·the angle with preceding vehicle 3 is measured with a unit 5 by a conventional method using a radio antenna unit 4 of the millimeter wave radar.

Measurement is performed with a unit 8 by measuring the angular velocity by a gyro sensor 6, and the steering angle is measured by steering sensor 7 with a unit 9.

By the measured angular velocity and the steering angle, a vehicle lane is judged with a unit 10 according to an algorithm mentioned later.

The preceding vehicle judgment with a unit 11 and stationary object judgment with a unit 12 in forward of the host vehicle are performed by the distance between the vehicles·the relative velocity·angle (preceding vehicle 3) which are measured and vehicle lane judgment.

Based on these judgments, an warning judgment with a unit 14 is done by using the warning judgment algorithm with a unit 13, and a vehicle velocity and a braking signal with a unit 26.

Based on the warning judgment, an warning designation with a unit 15 is performed, and an alarm signal 16 is given, and an alarm sound generation, lighting and display are performed in a driver display unit 17.

Figure 2:
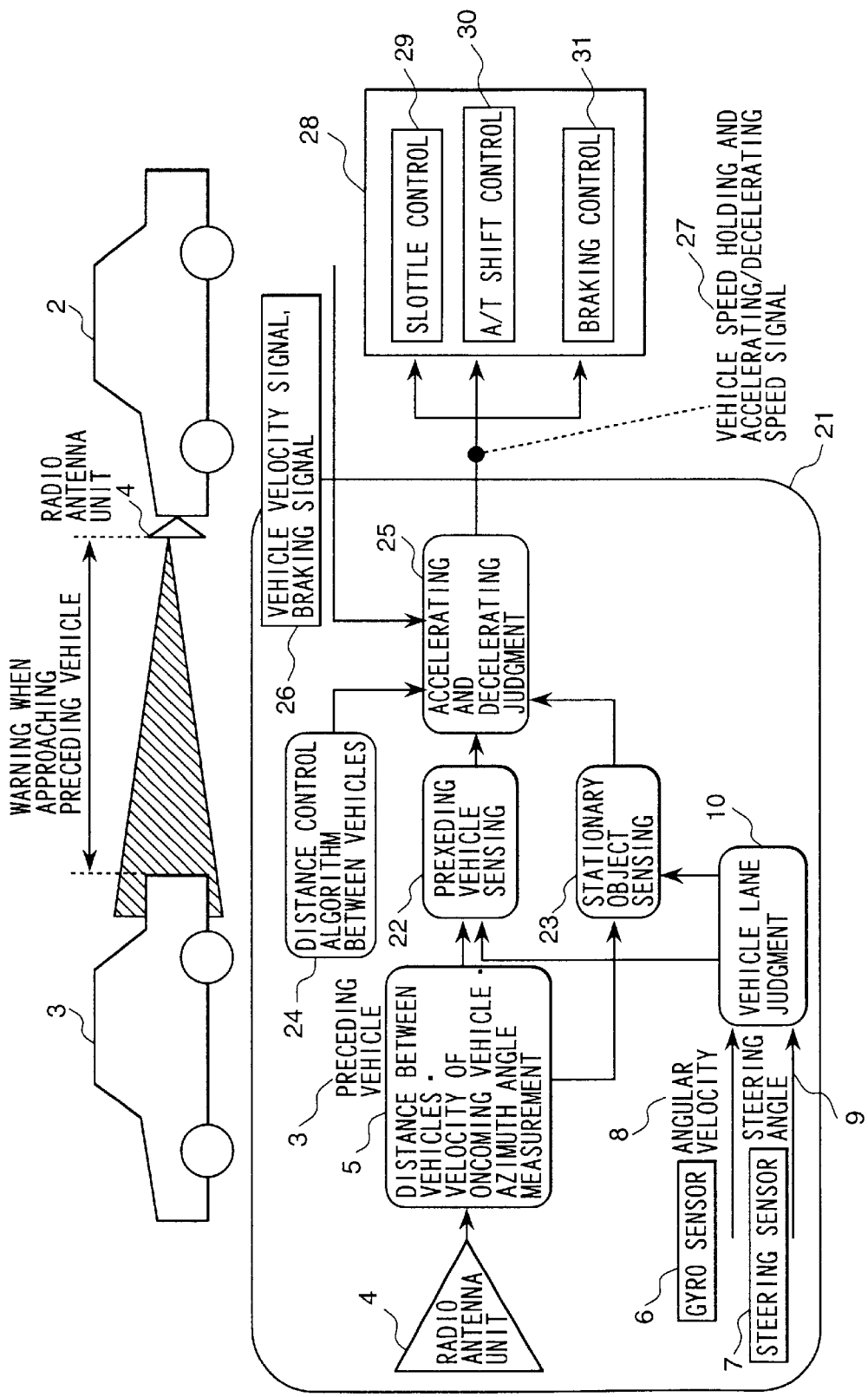
FIG. 2 is a contour block diagram of an ACC system.

FIG. 2 shows an other embodiment of the present invention, using a millimeter wave radar, a gyro sensor, or a steering sensor.

ACC system 21 is shown to drive following a preceding vehicle keeping a predetermined distance between the vehicles.

A millimeter wave radar signal is given from a radio antenna unit 4 toward a driving vehicle 3 from the host vehicle 2, a preceding vehicle detection with a unit 22 and a stationary object sensing 23 are performed by measuring the distance between the vehicles the relative velocity the angle and the vehicle lane judgment.

Based on these sensing, an accelerating and a decelerating judgment with a unit 25 is done by using the distance control algorithm 24 between the vehicles, a vehicle speed signal, and a braking signal 26.

Based on the judgment result, a vehicle speed holding and the accelerating/decelerating speed signal are given with a unit 27, the distance control between the vehicles with a unit 28 comprising a slottle control 29, a A/T shift control 30, and a braking control 31 is done.

In addition to above, the system of FIG. 1, FIG. 2 namely alarm system and an ACC system do not always exist only as separated system, but a system configuration having both function can be taken.

Figure 3:
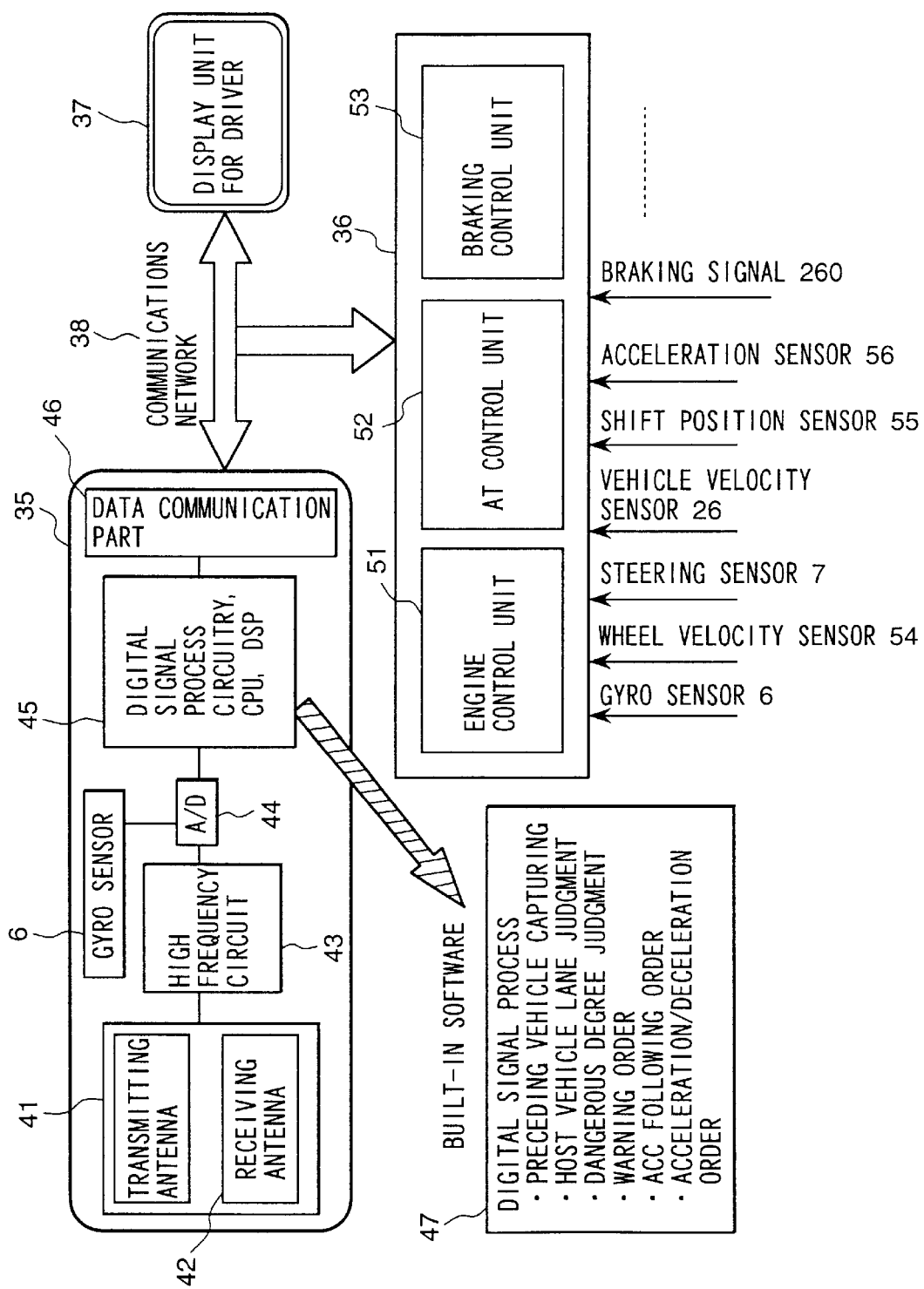
FIG. 3 is a control block diagram.

In next, FIG. 3 shows a hardware configuration to realize an embodiment of the system by FIG. 1 and FIG. 2 with a block diagram.

The construction shown in the figure are a one body type millimeter wave radar system 35, a vehicles side control part 36, and a display unit 37 for a driver.

The one body type millimeter wave radar system 35 has, for example, a communication network facility that used CAN, for example, and is constituted with a vehicles side control part 36, a driver display unit 37 and a communications network.

In the figure, a radar sensing signal obtained by a transmitting antenna 41 built in a unit 35, a receiving antenna 42 and a high frequency circuit 43, and an analog signal from the gyro sensor 6 are converted by an AD conversion 44, and are done signal processing by a digital signal process circuitry 45 (constituted with CPU, DSP etc.).

Said digital signal process circuitry 45 is installed a software as built-in software 47, in order to process a risk judgment and an warning order in an warning and an ACC following order and an accelerating deceleration orders ets. in the ACC based on the radar signal processing, preceding vehicle trapping, host vehicle lane judgment, etc.

As for these various signals, they are communicated through a communications network 38 and a data communication part 46.

The driver display unit 37 generate the alarm, do lighting and display the distance with the preceding vehicle according to a communication signal received.

According to setting modification of the driver to reverse, an adjustment of the distance that the warning occurs in the warning is performed, and the adjustment signal of the distance between the host vehicle and the preceding vehicle in the ACC is transmitted to the unit 35. In the digital signal attention circuitry 35, modification of the various parameter is enforced based on said adjusting signal.

The vehicle side control part 36 is used in order to constitute the ACC system.

This is constituted with an engine control unit 51, an AT control unit 52 and a braking control unit 53, the engine output, the AT shift position, and the automatic braking in order to slow down suddenly are performed in order to accelerate and to decelerate the vehicle by receiving a signal from the one body type millimeter wave radar system 35.

The vehicle side control part 36 is inputted various sensor signals which are necessary for controlling in the vehicle side, for example, a gyro sensor signal 6, a steering sensor signal 7, a vehicle speed sensor signal 26, a braking signal 260, a wheel velocity sensor signal 54, a shift position sensor signal 55, an acceleration sensor signal 56 etc.

And, the signals which are necessary for the one body type millimeter wave radar system 35 side, for example, the vehicle velocity sensor signal 26 and the steering sensor signal 7 are transmitted through a communications network 38.

In these system configuration, as the vehicle side control part 36 is a conventional technique and it is not described moreover in detail.

In next, in said built-in software 47, a method to judge vehicle lane in a curved road and a derivation of operating equation will be explained.

Figure 4:
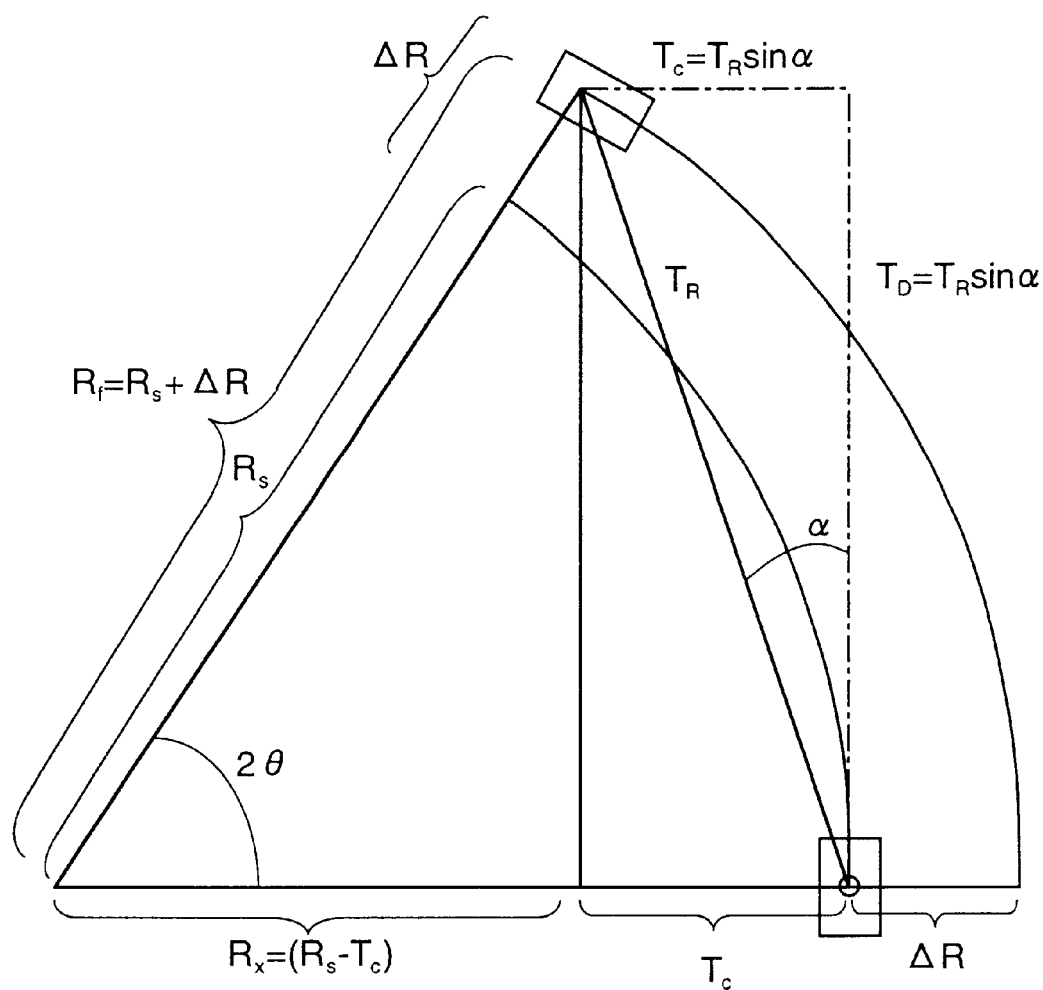
FIG. 4 is a figure of account system.

FIG. 4 shows a relationship between a own car which is on a circle contour of a curvature radius Rs and a lead car which is on Rf.

Judging from the host vehicle, whether the preceding vehicle is on the host vehicle or on an adjacent vehicle lane, can be judged by a difference ΔR of the curvature radius between the host vehicle and the preceding vehicle originally.

Method of operation will be explained as follows.

1. A distance Tr and a magnetic declination degree a are measured by using the millimeter wave radar, and a host vehicle angular velocity ωs and a host vehicle velocity Vs is measured with the built-in gyro sensor 6.

2. A side displacement TC, a longitudinal displacement TD and a host vehicle curvature radius Rs are calculated with the next equations.

$$T_c = T_R \sin \alpha,\ T_D = T_R \cos \alpha,\ R = V_s/\omega s$$

3. As shown in FIG. 4, as for the rotation radius Rf of the preceding vehicle, the next equation is obtained.

$$Rf^2 = Rx^2 + TD^2 = (Rs-Tc)^2 + TD^2$$

4. Therefore, the next equation is obtained.
[Equation 2]

$$\Delta R = Rf - Rs = \sqrt{(Rs-Tc)^2 + Td^2} - Rs \quad \text{(Equation 2)}$$

Here Ly is defined as a vehicle lane width.
[Equation 3]

$$|\Delta R| < Ly/2 \ (Ly: \text{one vehicle lane}) \quad \text{(Equation 3)}$$

The vehicle lane of the host vehicle is judged when the above equation is satisfied.

The value of Ly is not be a half vehicle lane width which is symmetric for an host vehicle because the host vehicle may not go on a center of the vehicle lane.

The setting method of the value is disclosed in an embodiment explained later.

Using FIG. 5 and FIGS. 6A, 6B in the next, a correction method of the curvature radius Rf of the preceding vehicle will be explained.

Currently, the position of the preceding vehicle in a curved road is estimated by correcting on the basis of the angular velocity measured with the gyro sensor.

In this correction method to use the angular velocity of the host vehicle, the preceding vehicle is calculated to be on a circle extended from a rotation center of the position which is same as the current host vehicle.

However, a real road does not consist of only a linear lane and a curve lane, and "a transition curve" section which is joined therebetween by changing R by degrees exists by all means.

Accordingly, even if it is assumed that the angular velocity is measured good enough in accurate, a right measurement is only performed when both of the preceding vehicle and the host vehicle is in a circle contour or a linear line.

Accordingly, it becomes important that this transition curve is detected and the R is corrected in suitable.

Figure 5:
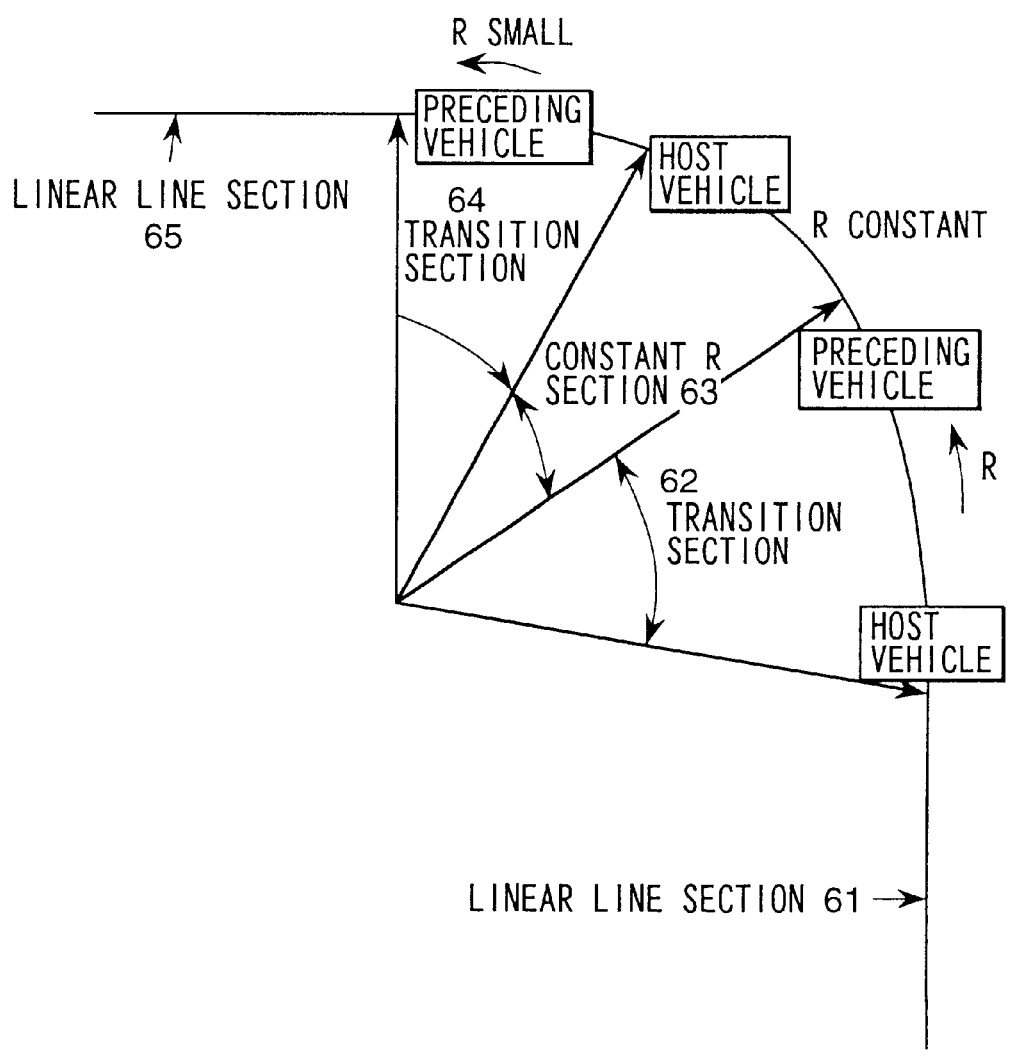
FIG. 5 is a curvature radius illustration.

FIG. 5 shows a transition section 62 connected to a linear line section 61, a constant R section 63, a transition section 64, and a linear line section 65 connected to said transition section 64.

In other words, the R becomes small (the angular velocity increases) in the transition section 62 by degrees, the R becomes constant (angular velocity constant) in the constant R section 63 (circle contour section), the R increases by degrees (angular velocity decrease) when coming in a reverse transition section 64, and it is returned to a linear line section (In the linear line, R=o).

Accordingly even if it is assumed that the preceding vehicle and the host vehicle ran at the same vehicle lane center, when the host vehicle is on the transition section 62, the preceding vehicle travels on the small R than this section 62, and reversely, when the host vehicle is on the transition section 62, the preceding vehicle travels on a bigger R than a detected R of the host vehicle.

Figure 6:
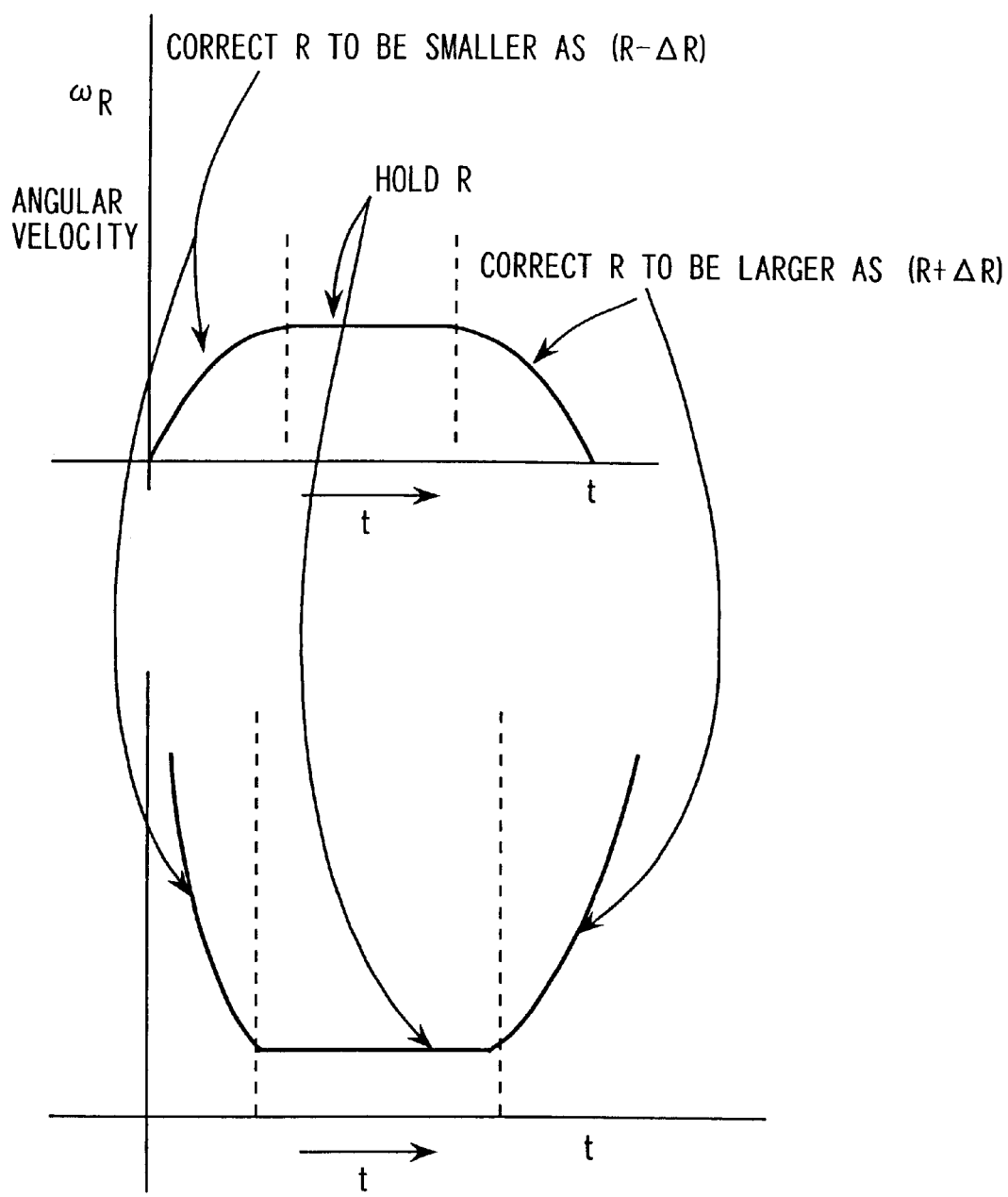
FIG. 6 shows related figures of the curvature change and the correction.

FIGS. 6A, 6B shows a change of the angular velocity ωR, a change of the curvature radius R, and a correction direction of the R detected when driving the curve.

Shown in the figure, the R is corrected in the transition section 62 a little to be (R−ΔR), the R is constant in the constant R section 63, the R is corrected greatly in the transition section 63 as (R+ΔR) so as to estimate the lane of the preceding vehicle.

Here, it is assumed that the preceding vehicle is followed by a status without relative velocity with the host vehicle.

Then the R is corrected using sensor information such as

1. A distance d with the preceding vehicle, and a magnetic declination θ and The change Δθ, 2. an angular velocity ωR every moment, and a change ΔωR thereof, 3. a steering angle φ and a change velocity δφ thereof.

Figure 7:
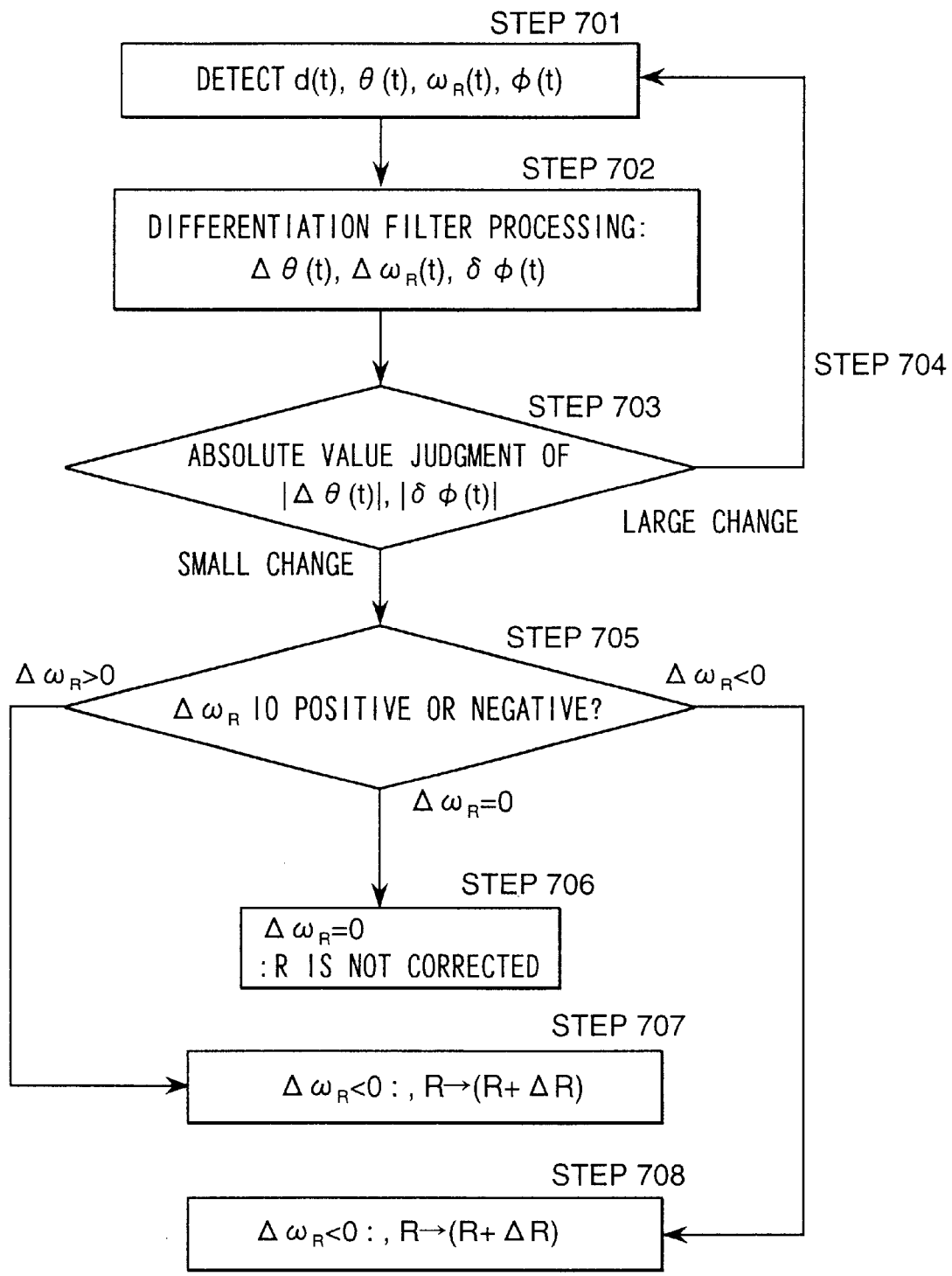
FIG. 7 is a figure of a flow chart of a correction step.

FIG. 7 is a flow chart showing a correction step.

At first, in a step 701, a distance d(t) with the preceding vehicle at a time t, the preceding vehicle magnetic declination θ(t), the angular the velocity ωR(t) and the steering angle φ(t) is detected and is stored.

In a step 702 in the next, a change Δθ(t), ΔωR(t) and δφ(t) of θ(t), ωR(t), φ(t) are obtained by performing a differentiation filter processing using past time t−1, t−2, . . .

In a step 703, absolute values |Δθ(t)| and |δφ(t)| of the Δθ(t) and δφ(t) are judged.

When the absolute values are changed greatly together, it is taken as a vehicle lane change and it is taken off from an object to be corrected (step 704).

On the other hand when it is not judged so, it is taken as the object to be corrected.

In a step 705, plus and minus of ΔωR(t) are judged. In case of ΔωR>0, the host vehicle is judged to be in the transition section 62, and the R is corrected to be small as (R−ΔR) (step 706,).

In a case of ΔωR<0, the host vehicle is judged to be in the reverse transition section 64, and the R is corrected to be large as (R+ΔR) (step 707).

In a case of ΔωR=0, the host vehicle is judged to be in the circle contour section 61, and the R is not corrected (step 708).

By the way, in a case that an warning and a ACC system are constituted with a millimeter wave radar as a key sensor, there are comparatively a few problems about a moving object such as the preceding vehicles driving.

However, in a case to perform the warning for forward stationary object or the ACC deceleration control, the millimeter wave radar can measure the distance with a target, a relative velocity and angle in accurate, but it is difficult to recognize what it is.

For example, when there is a curve in a forward direction, even if it is assumed that a stationary object is caught on a forward driving direction, it is difficult to judge whether it is a stopping vehicle on an host vehicle lane or a road sign installed on the road side and over the road.

In this way, the case that cannot be judged only with the millimeter wave radar exists sometimes.

Figure 8:
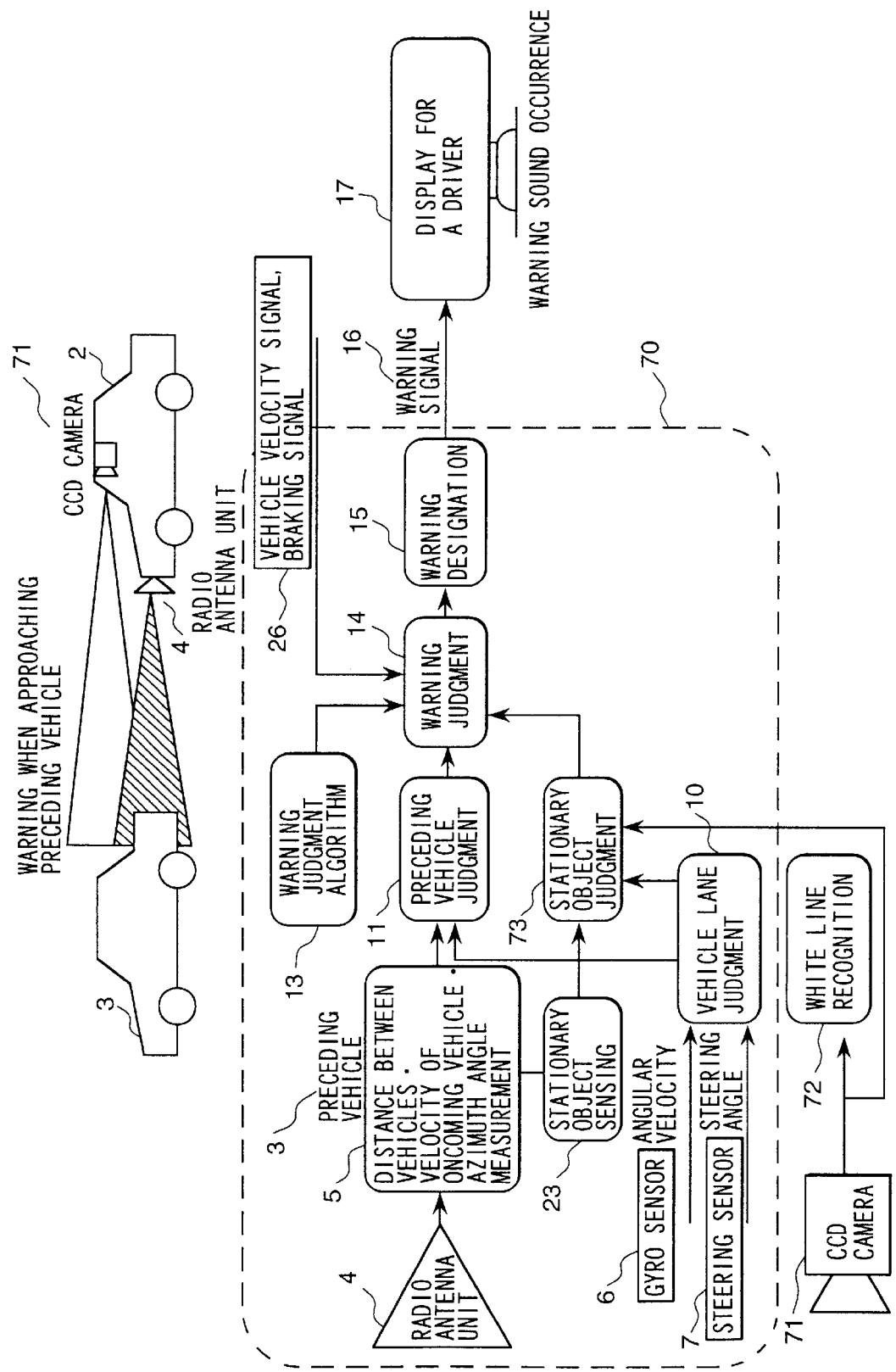
FIG. 8 is a contour block diagram of a distance between vehicles alarm system.

So in FIG. 8, in order to judge the warning for the stationary object precisely, an embodiment is provided which has a CCD camera being another kind of a sensor in an embodiment of FIG. 1.

The same numerals are referred to the constitution to be same as the constitution of an embodiment shown ahead in order not to repeat the same description.

The figure shows a distance between the vehicles alarm system 70 constituted by using signals from the millimeter wave radar, the gyro sensor, the steering sensor and the CCD camera.

In the figure, the CCD camera 71 is used for white line recognition 72 usually by a photography pictorial image thereby, and has a zoom lens function.

On the other hand, the millimeter wave radar performs a stationary object sensing from a distance, a relative velocity and an angle.

When the millimeter wave detects the stationary object 23 forward now, the camera stops a white line recognition 72 temporarily and zoom up the forward stationary object which the millimeter wave caught.

The stationary object recognition 73 is performed, and whether it is an obstacle such as the stopping vehicle or not, and whether it is non-obstacles such as a road sign outside of the road and an overhead bridge or not are judged.

Based on this stationary object recognition, the warning judgment 14 is performed, an warning designation 15 for a stationary object is performed and an alarm signal 16 is given to a driver display unit 17.

Figure 9:
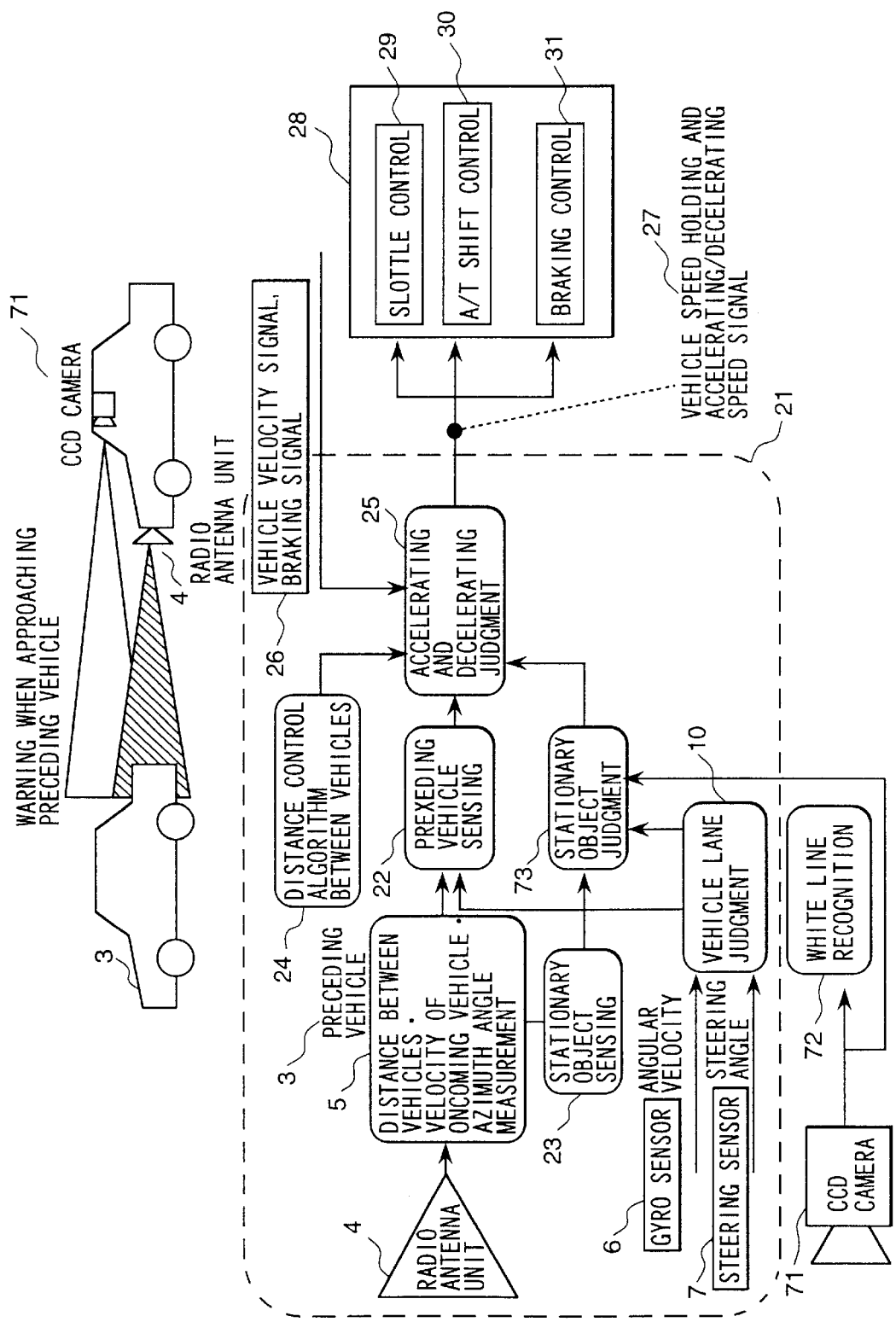
FIG. 9 is a contour block diagram of the ACC system.

FIG. 9 shows an ACC System 75 similarly using signals from the millimeter wave radar, the gyro sensor, the steering sensor and the CCD camera.

In the same way as the FIG. 8, a stationary object sensing—recognition is performed, and an accelerating and decelerating judgment 25 of the vehicle is performed based on a signal from the stationary object recognition 73 (A reducing speed judgment for the stationary object).

FIG. 10 shows a case to distinguish the overhead bridge and the stopping vehicle as one example of the stationary object.

The millimeter wave radar detects the overhead bridge in a considerably forward position, 100–150 [m] ahead numerically.

In this period, it cannot be distinguished whether the forward stationary object is the overhead bridge or the stopping vehicle.

When the detected stationary object is the stopping vehicle, it becomes necessary to warn in this period because it takes much time for the deceleration in a high-speed driving with more than 100 km per an hour.

Then, whether it is the overhead bridge or the road obstacle such as the stopping vehicle, is judged by performing the image processing using the camera. The image processing means to distinguish the target by a pattern matching and a sensing accuracy is not demanded so much.

As a result of discrimination, when it is taken as the overhead bridge, the alarm is not outputted.

In this way, it becomes possible to improve the accuracy of the warning by combining the target sensing by the millimeter wave with the target discrimination by the camera image processing.

By the way, if it is assumed that the forward stationary object is discriminated and it is the obstacle such as the stopping vehicle on the vehicle lane, they are not complete as a judgment object for outputting the warning.

For example, in a cases that there is a branching road forward, and there is a stopping vehicle on one side thereof, an accurate judgment whether the warning should be outputted is not performed if it is not understand which course the vehicle selects.

Figure 11:
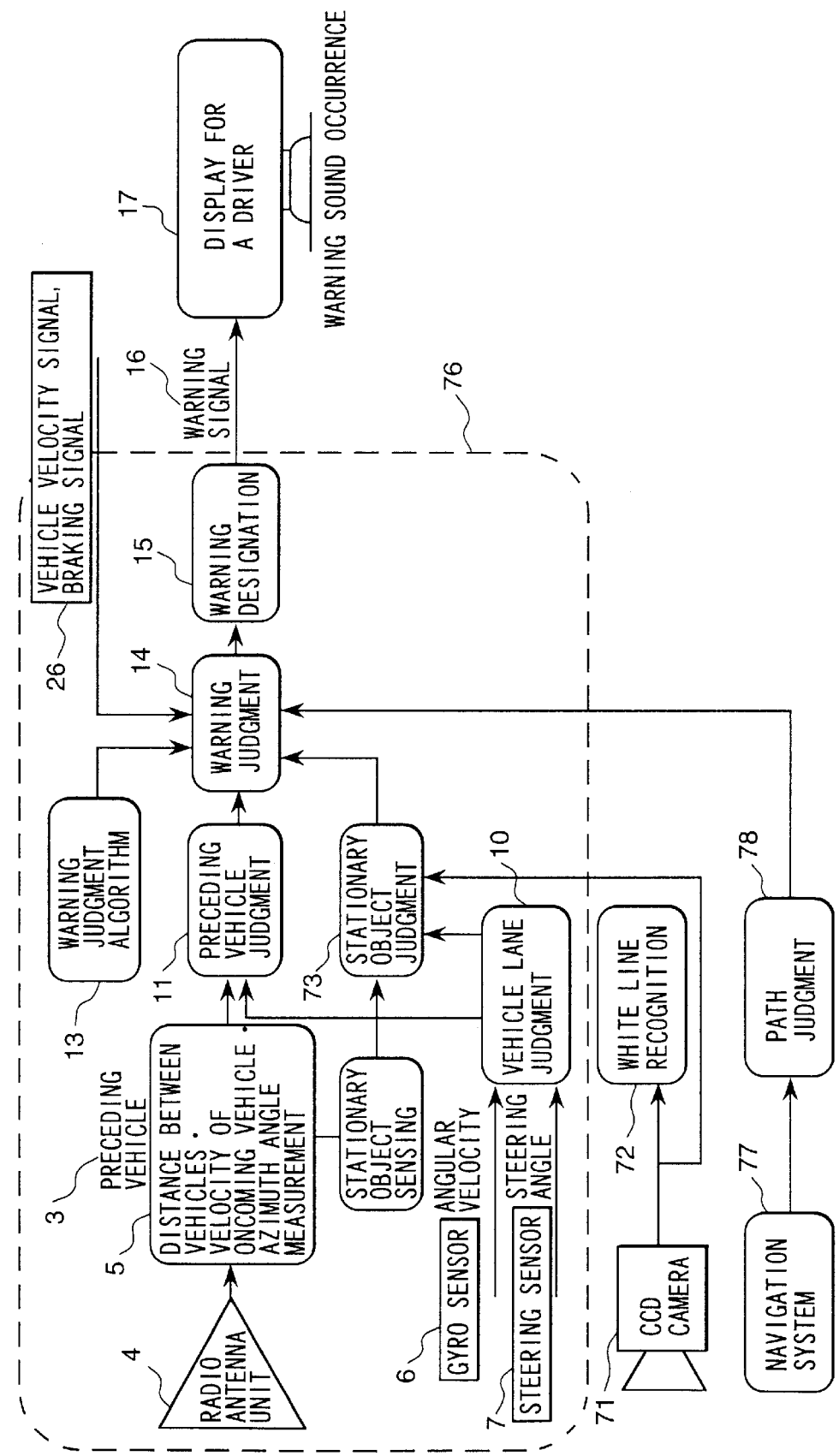
FIG. 11 is a contour block diagram of a distance between vehicles alarm system.

Then, in FIG. 11, a distance between the vehicles alarm system 76 constituted by using a signal from a navigation system in addition to the millimeter wave radar, the gyro sensor, the steering sensor, and the CCD camera. In the figure, a path judgment 78 is performed by using the navigation system 77.

With the sensor except the navigation system, the stationary object sensing and the stationary object recognition are performed, and it is assumed that the warning object such as the stopping vehicle is judged.

Then, according to a path judgment function 78 by the navigation system 77, it is judged whether the warning object is on the driving vehicle lane in the future, and warning designation 15 is performed only when it is judged to be on the driving vehicle lane.

Accuracy of the warning designation 15 improves hereby.

Figure 12:
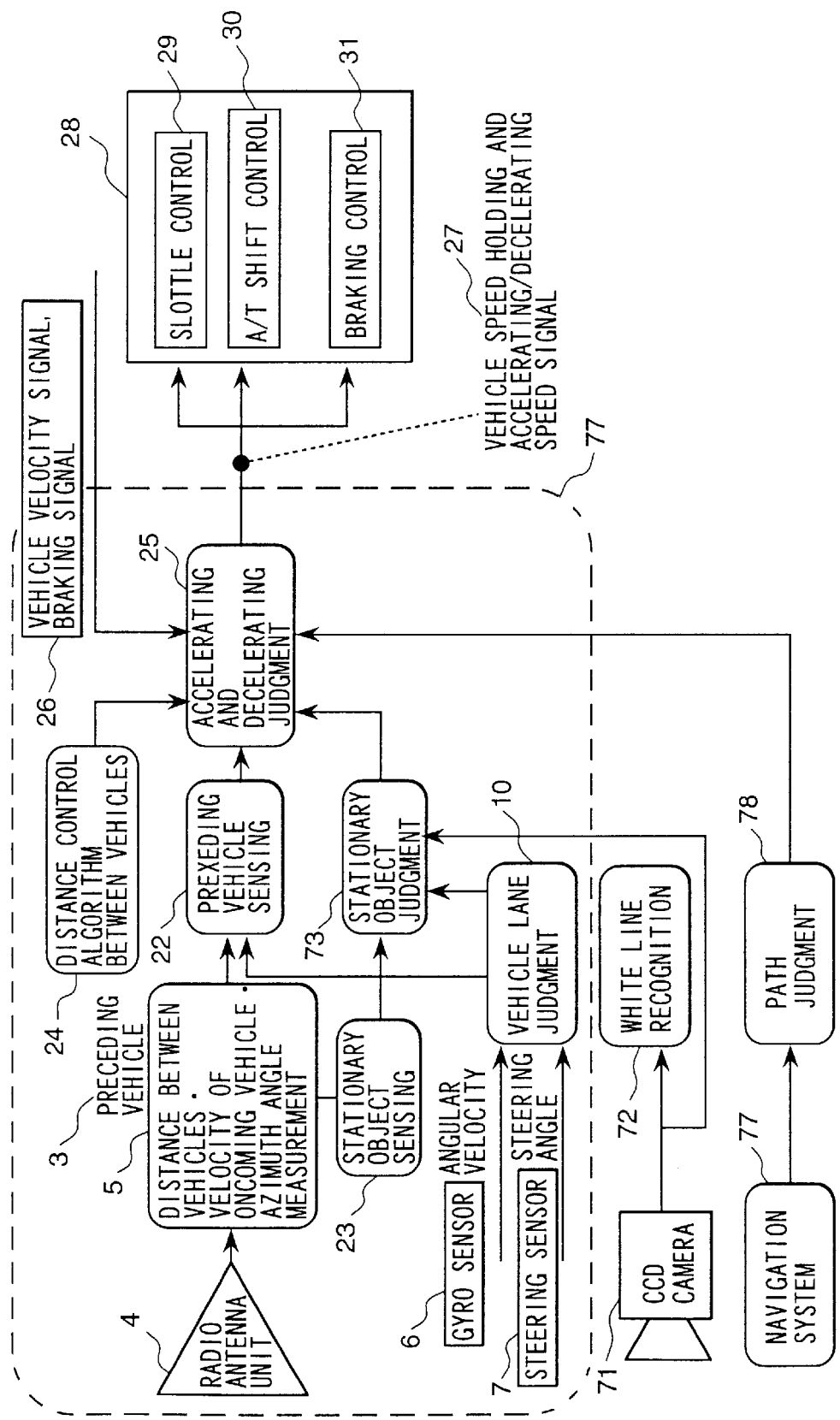
FIG. 12 is a contour block diagram of an ACC system.

In FIG. 12, an ACC system 75 constituted by using a signal from the millimeter wave radar, the gyro sensor, the steering sensor, the CCD camera and the navigation system. In the figure, an accelerating and decelerating judgment 25 is performed based on the signal by a path judgment 78.

Thereby the distance between the vehicles control is performed in highly accurate.

In the embodiment shown in FIG. 8 to FIG. 11 that mentioned the above, it was realized to alarm for a stationary object and to control it in highly accurate by adding the camera and the navigation system in addition to the millimeter wave radar.

In the following embodiment, the system which used only the gyro sensor and the steering sensor is provided as the millimeter wave radar and an auxiliary sensor shown in FIG. 1 and FIG. 2.

In this case, even if it is assumed that the circumstances is limited, it may be realized to alarm and control it in highly accurate by solving the following problems.

1. Cannot a curve to start with the forward host vehicle be estimated?
2. Cannot estimate where of center or side of the host vehicle lane the host vehicle runs?
3. Cannot judge whether there is a stationary obstacle on the host vehicle lane from a relationship of transfer objects?

They will be explained based on drawings as follows.

FIGS. 13($a$), 13($b$) shows two cases that a driving vehicle moves in forward of the host vehicle into lateral direction on the road having plural driving vehicle lanes.

Figure 13A:
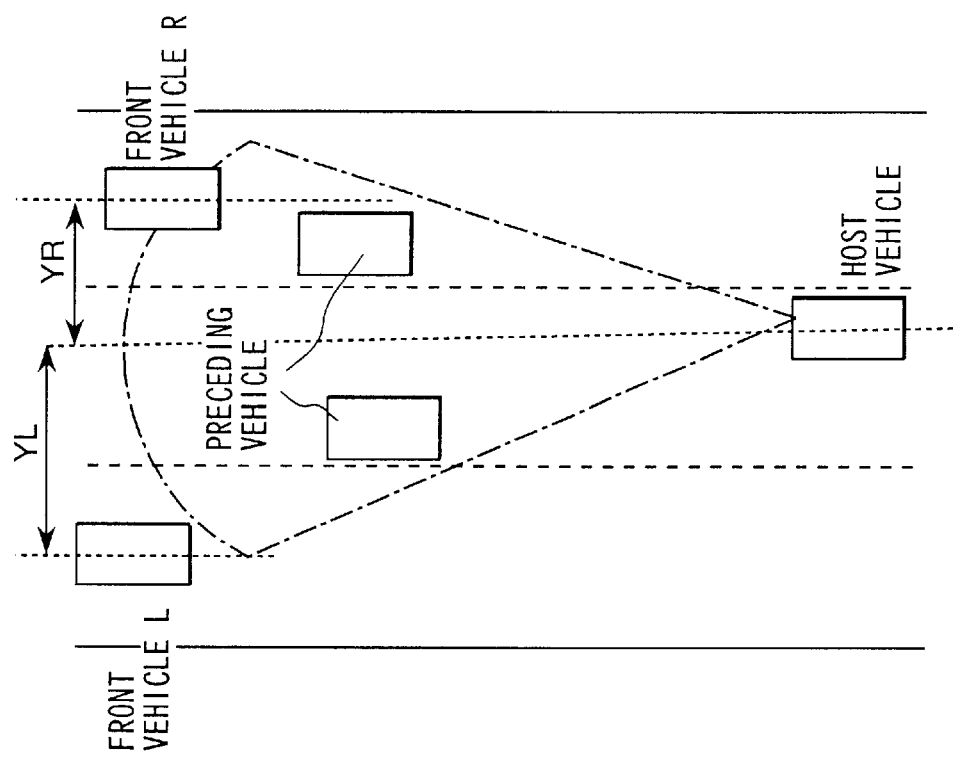
FIGS. 13A and 13B show figures to discriminate a curve and a vehicle lane change of a preceding vehicle.
Figure 13B:
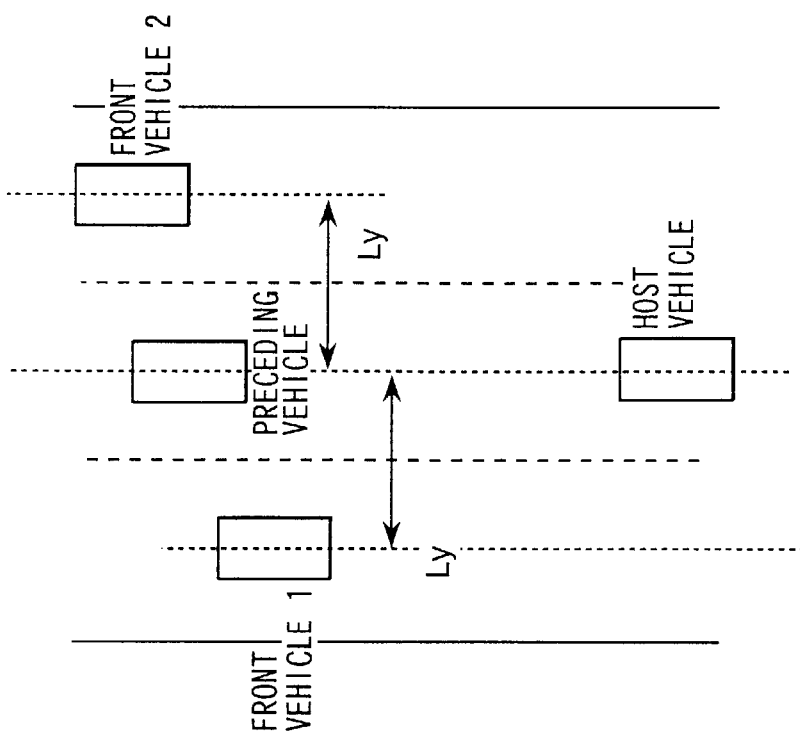

FIG. 13A shows a case that the host vehicle is before the curved road and the forward preceding vehicle is on the curved road, and FIG. 13B shows a case that the preceding vehicle changes the vehicle lane.

In FIG. 13A, the preceding vehicle is a object to be alarmed or be followed continuously, and in FIG. 13B, the receding vehicle becomes not to be the following object.

When both is looked at from the host vehicle, the preceding vehicle looks to move to the lateral direction, it can be distinguished from the movement of other vehicle.

In other words, forward vehicle 1 and forward vehicle 2, and the preceding vehicle moved to the same lateral direction are detected, and it is judged to be the curved road when they moved to the same lateral direction, and it is judged to be the vehicle lane change when they moved to the different direction.

Figure 14:
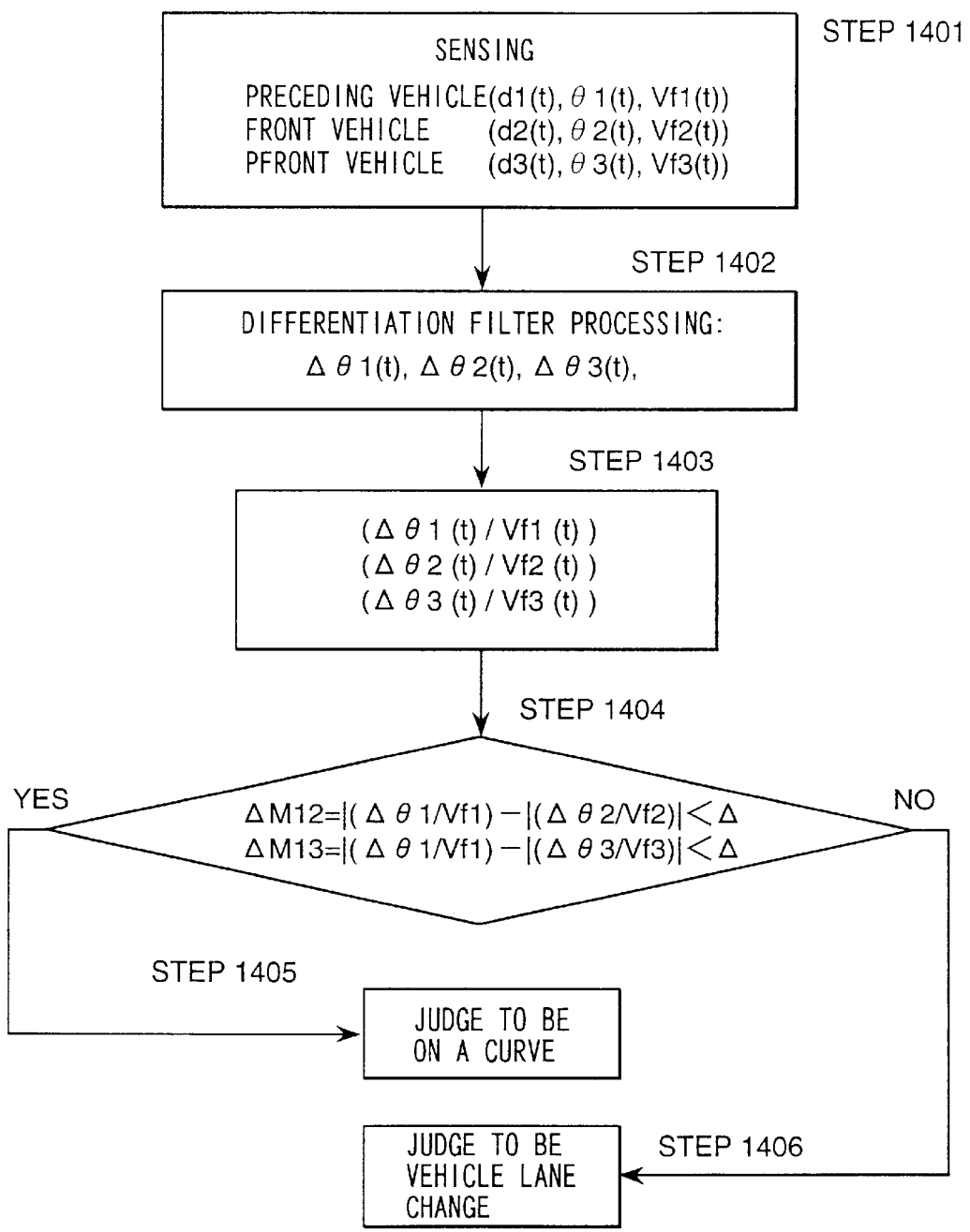
FIG. 14 is a flow chart of the discrimination method.

FIG. 14 is a flow chart showing steps to distinguish FIG. 13A and FIG. 13B.

At first in step 1401, the velocity of the preceding vehicle (d1(t), θ1(t), Vf1(t)) is detected from a distance with the preceding vehicle 1 at time t, the magnetic declination degree, and from the host vehicle velocity and the relative velocity.

Similarly, relating to the forward vehicle 2, 3 except the host vehicle lane, (d2(t), θ2(t), Vf2(t)), (d3(t), θ3(t), Vf3(t)) are detected. (The forward vehicles to be detected is determined to be two here, however when it can be detected more, detected vehicle number may be increased).

In a step 1402 in the next, using data of past times t−1, t−2, . . . , a differentiation filter process is performed, and the changes Δθ1(t), Δθ2(t), Δθ3(t) of θ1(t), θ2(t), θ3(t) are obtained.

In a step 1403, (Δθ1(t)/Vf 1(t)), (Δθ2(t)/Vf2(t)), (Δθ3(t)/Vf3(t)) are obtained.

These are equivalent to an angle which changes corresponding to the driving distance of the vehicle, and it does not depend on the velocity of each vehicle. Using this in a step 1404, a transfer distance of the preceding vehicle and forward vehicles 1, 2 is obtained so as to be judged by obtaining Δ M12 and Δ M13 based on equations as follows.

$$\Delta M12 = |(\Delta\theta1/Vf1) - (\Delta\theta2/Vf2)|,$$

and $$\Delta M13 = |(\Delta\theta1/Vf1) - (\Delta\theta3/Vf3)|,$$

The values of Δ M12 and Δ M13 are equal to or less than a predetermined value, it is judged to be the transfer on a curve (step 1405).

On the other hand when it is bigger than the value, it is judged to be the vehicle lane change (step 1406).

An example is shown here, in which, the host vehicle and the preceding vehicle runs at the center of a 3 vehicle lanes, and other ones respectively run on right and left vehicle lanes.

If the forward vehicle except the preceding vehicle is caught on or more than two vehicle lanes, a similar estimation may be performed.

However, estimation accuracy improves further when the more vehicles are captured.

Although the hypothesis is different from a cases that he forward vehicle especially changes the vehicle lane, such a false estimation can be avoid by increasing captured vehicle.

By the way in FIGS. 13($a$) or ($b$) figure, in the host vehicle lane estimation, the vehicle lane position of the preceding vehicle is judged by supposing that the host vehicle run the vehicle lane center.

For example, as shown it in FIG. 13A, the preceding vehicle and forward vehicle run at the vehicle lane center, and the lateral position of each vehicle is almost equal to the vehicle lane width Ly, there is not a problem.

However, as in FIG. 13B, when the host vehicle, the preceding vehicle, and the forward vehicle deviate to one end of the vehicle lane, it becomes difficult to understand which is the preceding vehicle.

Including this case, the driving position to the white line of the host vehicle is estimated, and it is important to reflect it to the preceding vehicle judgment by offsetting the range of the host vehicle lane to the right or the left.

Figure 15:
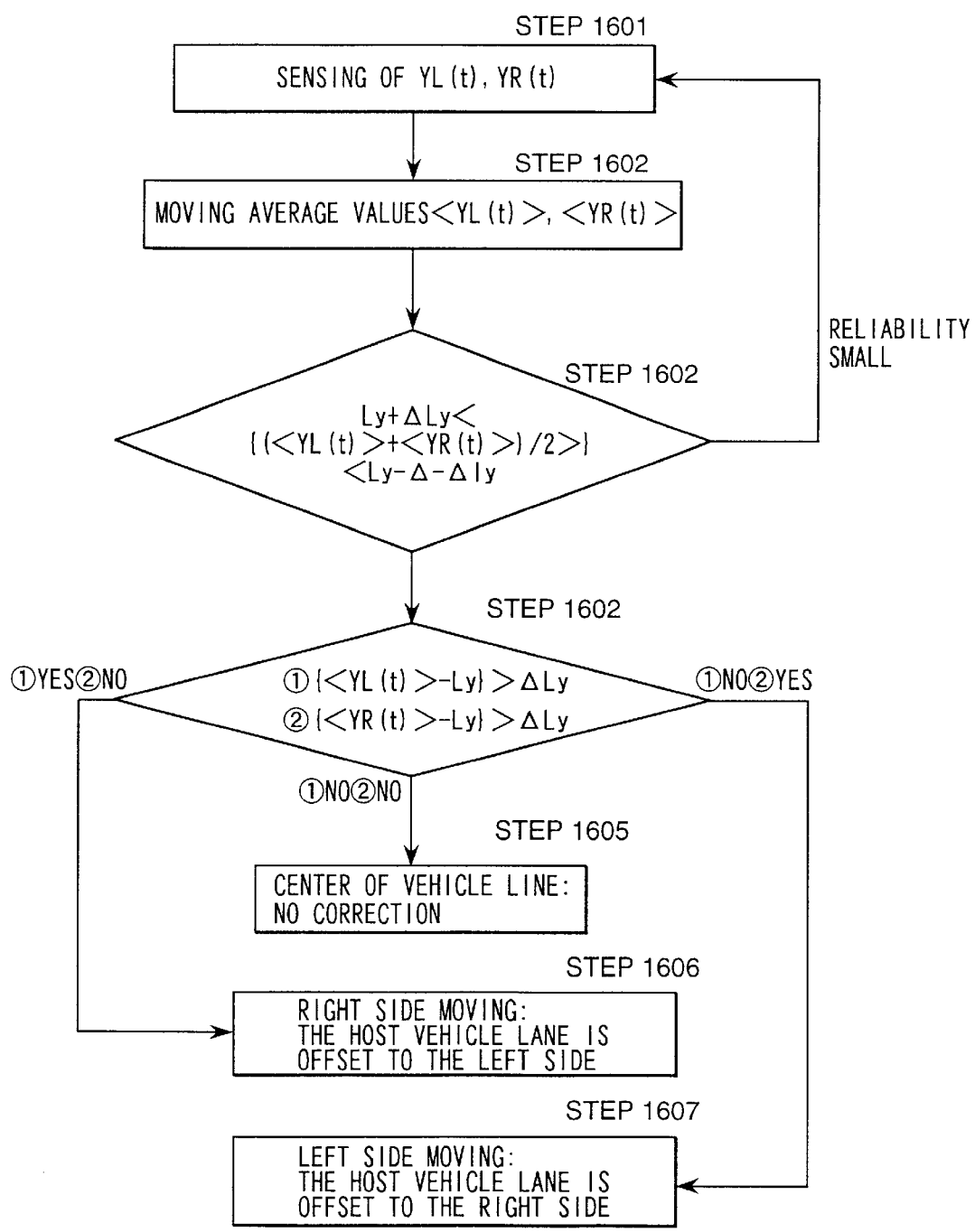
FIG. 15 is a flow chart of host vehicle lane position estimation.

FIG. 15 shows a flow chart relating to a method to estimate the host vehicle position and to offset the host vehicle lane position to the right or the left based on the estimated host vehicle position.

At first in a step 1601, the lateral position YL(t), YR(t) of the right and the left forward vehicle, are obtained except one vehicle which is recognized as the preceding vehicle. (When it cannot be judged as shown in the FIG. 13B, one in a side which the magnetic declination is small, is judged to be the preceding vehicle.)

In a step 1602, a moving average values <YL(t)>, <YR(t)> of YL(t), YR(t) which are sampled a predetermined times in the past.

In step 1603, corresponding to <YL(t)>, <YR(t)> obtained, Ly+ΔLy<{(<YL(t)>+<YR(t)>)/2>}<Ly−Δ1y is judged. (Here Ly: one vehicle lane width, ΔLy: value to be smaller than the one vehicle lane width). When the condition is not satisfied, it is assumed that reliability of the data is low, and it is not adopted.

When the condition is satisfied, the step 1604 is absorbed and is judged according to the next equation.

When {<YL(t)>−Ly}>ΔLy and {<YR(t)>−Ly}<ΔLy, it is judged as a right side moving.

When {<YL(t)>−Ly}<ΔLy and {<YR(t)>−Ly}>ΔLy, it is judged as a left side moving.

When {<YL(t)>−Ly}<ΔLy and {<YR(t)>−Ly}<ΔLy, it is judged as a center.

In a step 1605, the range of the host vehicle lane judgment is offset to the right side or to the left side, or it is judged to be maintained according to the result.

The above is a case in which the vehicles run at the center of the three vehicle lanes, and even if it is two vehicle lane or a forward road it is possible to be similar.

In this case, the forward vehicle in only one side or transverse direction distance with the forward vehicle are used for a reference, and reliability is improved by increasing number of the sample.

Further, in this method, because of a problem relating to an installation of the millimeter wave radar, even if when it must be mounted on the right or the left of the vehicle, it can be revised by estimating automatically.

A case that the preceding vehicle moves to the transverse direction and the stationary object appeared over there, will be explained in the next.

Figure 16B:
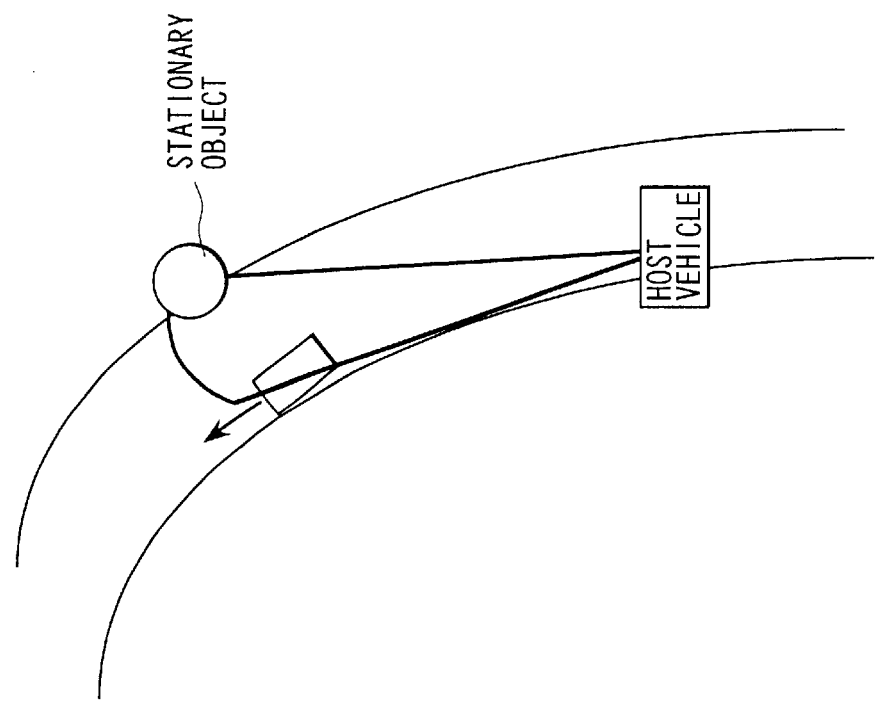
FIGS. 16A and 16B show figures of the preceding vehicle and the stationary object recognition and moving velocity.
Figure 16A:
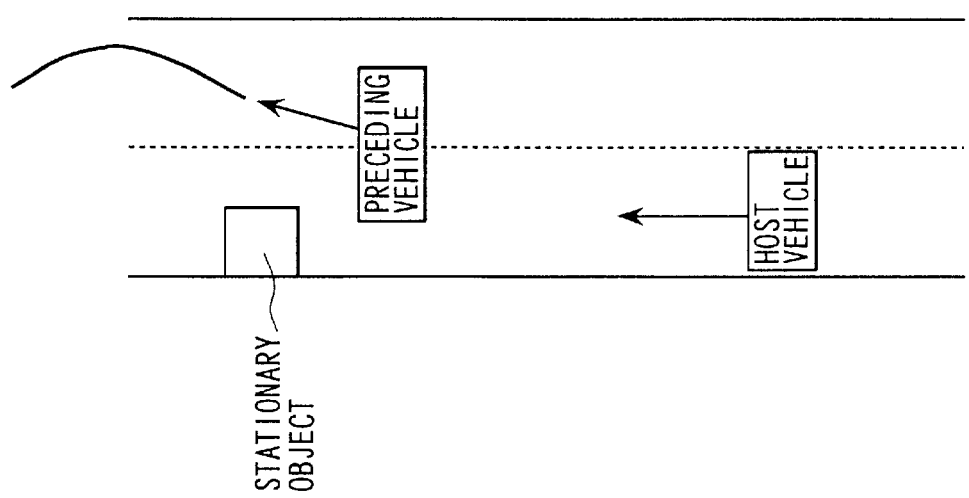

FIGS. 16A and 16B show a case that the preceding vehicle moves to the transverse direction and the stationary object appeared over there.

Basically, an alarm is generated in FIG. 16A, and it is not generated in FIG. 16B.

However, because a course forward cannot be predicted, they can not be distinguished.

Figure 17:
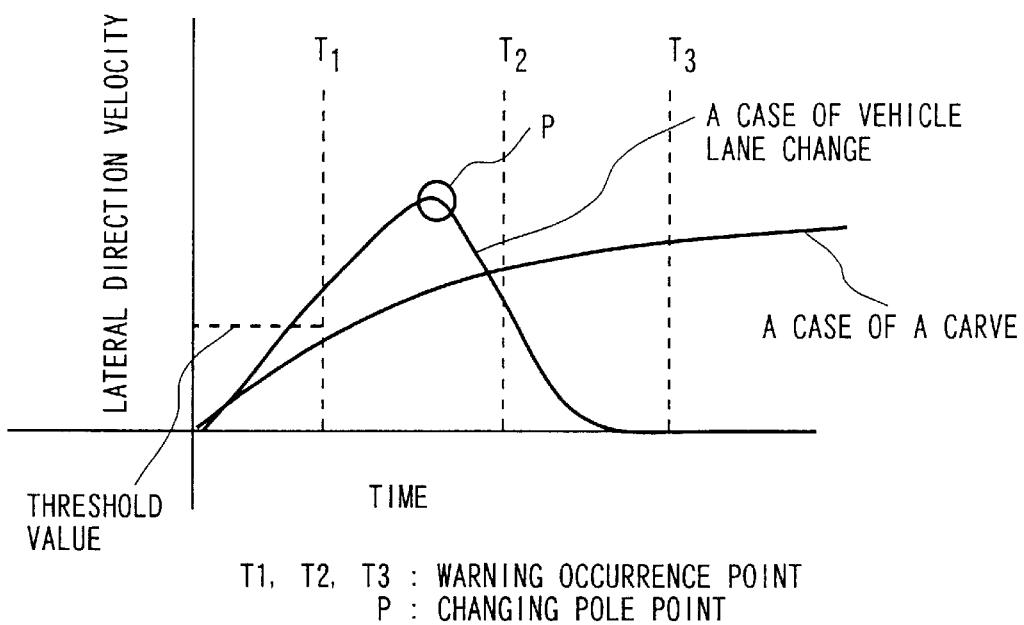
FIG. 17 is a figure of transverse direction transfer of the curve and the vehicle lane change.

Then, FIG. 17 shows a method to plan to distinct the both by paying attention to the transverse moving velocity of the preceding vehicle and the pattern.

When, the transverse moving velocity of the preceding vehicle is shown with a relationship with time as shown in the figure, the curved road is detected showing a gentle change, however, in case of vehicle lane change, the velocity is large at first because the steering angle is large, and the lateral direction velocity disappears cause the steering is returned after the vehicle lane range, so that it is detected as a variation of a convex shape.

The host vehicle closes to the stationary object while detecting the movement of the preceding vehicle, and a timing to alarm judgment at time T1, T2, and T3 according to the vehicle velocity of the host vehicle and the distance between the cars, becomes different.

In cases of T2, T3, the judgment is easy, and the both can be distinguished easily by detecting a changing pole point P of the preceding vehicle driving speed.

On the other, in time T1, the both is needed to be distinguished on the basis of one threshold value.

This threshold value is changed at any time according to the host vehicle velocity, the preceding vehicle velocity, the preceding vehicle magnetic declination degree, the host vehicle angular velocity and the distance between the vehicles.

Figure 18:
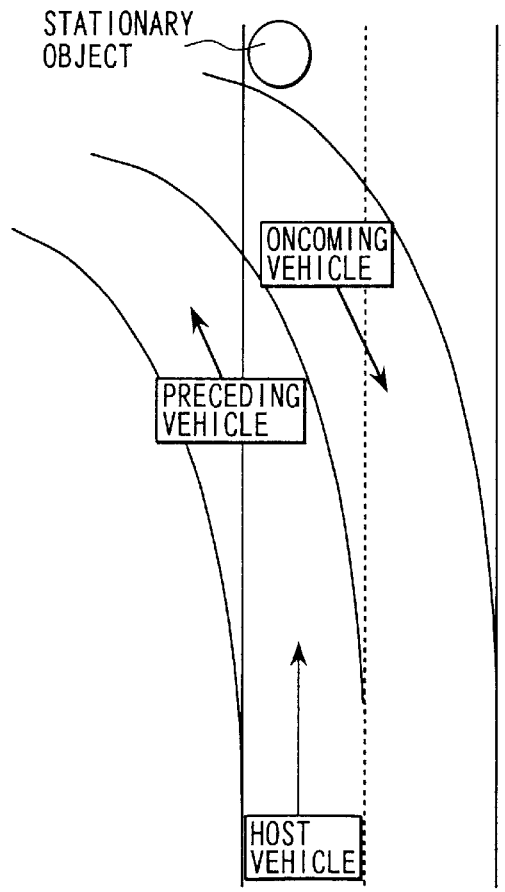
FIG. 18 is a figure of the oncoming vehicle and the stationary object recognition.

FIG. 18 shows a case that an oncoming vehicle goes across the stationary object which is more distant than the oncoming vehicle.

In such a case, it is not considered to be the stationary object which is on the host vehicle lane and the alarm is not generated.

In such a method, the oncoming car is captured in a magnetic declination degree neighborhood of the stationary object caught at first, if the distance between the vehicles is closer than the stationary object, the stationary object is considered to be outside of the vehicle lane and it is not an object to be generated the alarm.

In this case, this judgment is performed on the basis of a time difference that caught the stationary object and the oncoming vehicle and by correcting the movement of the host vehicle.

As stated above, in the present invention,

A correct estimation equation of the preceding vehicle position is provided, and a device which used it is proposed.

The correction amount is changed at an introduction part of the curve: angular velocity generation early stage (an increase direction), and at a rear part of the curve: angular velocity generate later stage (a decrease direction).

On the basis of the sensing positions of plurality of the preceding vehicles, white line position is estimated.

The curve forward and the branching are judged by detecting the movement amount in the lateral direction of the forward vehicle.

Judgment of the host vehicle lane and the position correction of the preceding vehicle are performed by using both of the gyro sensor and the steering sensor.

The lane position judgment of the preceding stationary object and presence judgment of the stationary object warning are performed by movement of the preceding vehicle.

The lane position of the preceding stationary object is judged by a relation with the oncoming vehicle.

The stationary object which is detected forward is recognized to be a stationary target on the road and the warning is not generated when it is the stationary target.

When the stopping vehicle is captured on the driving lane, the driving lane is judged whether it is a driving route of the host vehicle or not, and if it is judged to be the driving route of the host vehicle, a warning is generated.

A one body type millimeter wave radar system building in a communications network facility and a judgment control function.

[Effect of the Invention]

As being constructed as above, the present invention has effects as follows.

Distance of the host vehicle with the preceding vehicle is controlled to become a desired value, by detecting a preceding vehicle on a host vehicle lane(including a stopping vehicle) using a millimeter wave radar, or when the host vehicle comes too much close with the preceding vehicle, a collision warning is generated.

In addition, a warning or the control (deceleration) can be performed only the forward stopping vehicle of the host vehicle lane, by distinguishing the stopping preceding vehicle from the road sign on the road side and the stationary object such as the overhead bridge.

On the basis of movement of the preceding vehicle which the radar caught and other sensor information, an accurate host vehicle lane estimation and a position correction of the vehicle can be performed in a curve road.

The lane position estimation of the preceding vehicle is performed by receiving various data from the vehicle side and by combining it with the sensing information obtained by the millimeter wave radar, a warning and a control command information can be transmitted to the vehicle side.

What is claimed is:

1. A vehicle lane position estimation device for capturing a preceding vehicle or a target by searching forward of an host vehicle and estimating vehicle lane position thereof, said vehicle lane position estimation device comprising means for measuring a distance TR between said host vehicle and said preceding vehicle or said target, a direction angle from said host vehicle, an angular velocity Ws and a velocity Vs of said host vehicle, one vehicle lane sensing means for obtaining a lane Ly of a road, means for calculating a lateral displacement TC between said host vehicle and said preceding vehicle or said target, a longitudinal displacement TD therebetween and a curvature radius R of said host vehicle based on a following equation $$T_C = T_R \sin \alpha, T_P \cos \alpha, R = V_s/W_s,$$

a means for calculating lateral distance ΔR between said host vehicle and said preceding vehicle or said target based on a following equation, means for comparing Ly/2 with ΔR, and means for judging said preceding vehicle or said target to be in a vehicle lane of said host vehicle when |ΔR|<Ly/2 further comprising means for judging whether a curve of said road is a transition curve section where a curvature radius thereof changes every moment sometimes, or a maximum curve section where said curvature radius does not changes, and means for correcting a curvature radius Rs of said host vehicle used for correcting said curvature radius Rf of said preceding vehicle to be smaller than a predetermined value when a transition curve is in an introduction part of the curve, and for correcting said curvature radius Rs to be larger than said predetermined value when said transition curve is in an rear part of the curve.

2. A vehicle lane position estimation device as defined in claim 1, wherein a CCD camera and a navigation device having a route guidance function are used as said means force measuring.

3. A vehicle lane position estimation device as defined in claims 1, further comprising means obtaining a distance of the vehicles from said preceding vehicle, and means for warning when said distance becomes a predetermined distance.

* * * * *